United States Patent [19]

Schreiber

[11] Patent Number: 4,803,722
[45] Date of Patent: Feb. 7, 1989

[54] CIRCUIT FOR REMOTE SUPPLY OF SUBSCRIBER LINE TERMINALS IN A TELECOMMUNICATION SYSTEM

[75] Inventor: Harald Schreiber, Salzkotten, Fed. Rep. of Germany

[73] Assignee: Nixdorf Computer AG, Paderborn, Fed. Rep. of Germany

[21] Appl. No.: 849,977

[22] Filed: Apr. 10, 1986

[30] Foreign Application Priority Data

Apr. 16, 1985 [DE] Fed. Rep. of Germany ....... 3513625

[51] Int. Cl.$^4$ ............................................. H04M 19/00
[52] U.S. Cl. ..................................... 379/413; 379/387; 363/20
[58] Field of Search ................ 379/156, 338, 345, 340, 379/344, 341, 342, 339, 346, 347, 348, 349, 387, 395, 394, 398, 399, 413, 412, 400, 402, 418; 363/65, 20, 21, 97

[56] References Cited

U.S. PATENT DOCUMENTS

| | | | |
|---|---|---|---|
| 3,204,048 | 8/1965 | De Monte | 379/346 X |
| 4,056,688 | 11/1977 | Stiefel | 379/346 X |
| 4,056,693 | 11/1977 | Bosik et al. | 379/418 |
| 4,301,497 | 11/1981 | Johari | 363/21 |
| 4,336,423 | 6/1982 | Morlec et al. | 379/346 X |
| 4,425,512 | 1/1984 | Tomooka et al. | 379/413 X |
| 4,439,637 | 3/1984 | Terry | 379/413 X |
| 4,465,967 | 8/1984 | Tokunaga et al. | 379/387 X |
| 4,532,384 | 7/1985 | Keriakos et al. | 379/346 |
| 4,600,811 | 7/1986 | Hayashi et al. | 379/405 X |
| 4,626,626 | 12/1986 | Coulmance | 379/413 X |
| 4,639,551 | 1/1987 | Kaire | 379/413 X |
| 4,644,458 | 2/1987 | Harafuji et al. | 363/65 |
| 4,677,662 | 6/1987 | Lott | 379/162 |

OTHER PUBLICATIONS

"Resonant Switching Converter", B. E. Patterson, IBM Technical Disclosure Bulletin, vol. 22, No. 8B, Jan. 1980, pp. 3551-3552.
"Local-Battery Cahrging Over Subscribers' Lines", B. R. Freer et al., The Post Office Electrical Engineers' Journal, vol. 66, Part 2, 1973, pp. 73-76.

Primary Examiner—Jin F. Ng
Assistant Examiner—Randall S. Vaas
Attorney, Agent, or Firm—Cullen, Sloman, Cantor, Grauer, Scott & Rutheford

[57] ABSTRACT

A circuit for remote supply of subscriber line terminals in telecommunication systems, especially suitable for employment in digital telecommunication systems, is described. The circuit comprises a supply circuit (10) at the beginning of the subscriber line (11), which circuit has a negative internal resistance operative when a preassigned supply amperage is exceeded. Between the subscriber line (1) and the terminal, a current converter cirucit (12) is provided, containing an energy reservoir (40) on the primary side and a switch-on circuit (41-44) operating in dependence upon its charge voltage for the switch pulses required for start-up. The operating current for the switch pulses is then delivered by a secondary winding (57) of the converter transmitter (27). A pulse width modulation of the switch pulses is effected, in addition to a control voltage derived from the secondary side of the converter transmitter (27), in the switch-on process, by a rising ramp-like direct current voltage preventing too violent a discharge of the condenser (40) at the input of the current converter (12). When switched on, the entire arrangement brings about a slow rise of the current on the subscriber line (11). Furthermore, the condenser meets the exaggerated energy demand upon start-up of the current converter (12) and compensates for fluctuations in energy demand during operation. The switch-on circuit (41-44) is kept switched on after the current converter (12) has been switched on by way of a direct current voltage derived form the secondary side, even if the input voltage drops below the switch-on circuit (41-44) switch threshold operative in the switched-off condition.

20 Claims, 1 Drawing Sheet

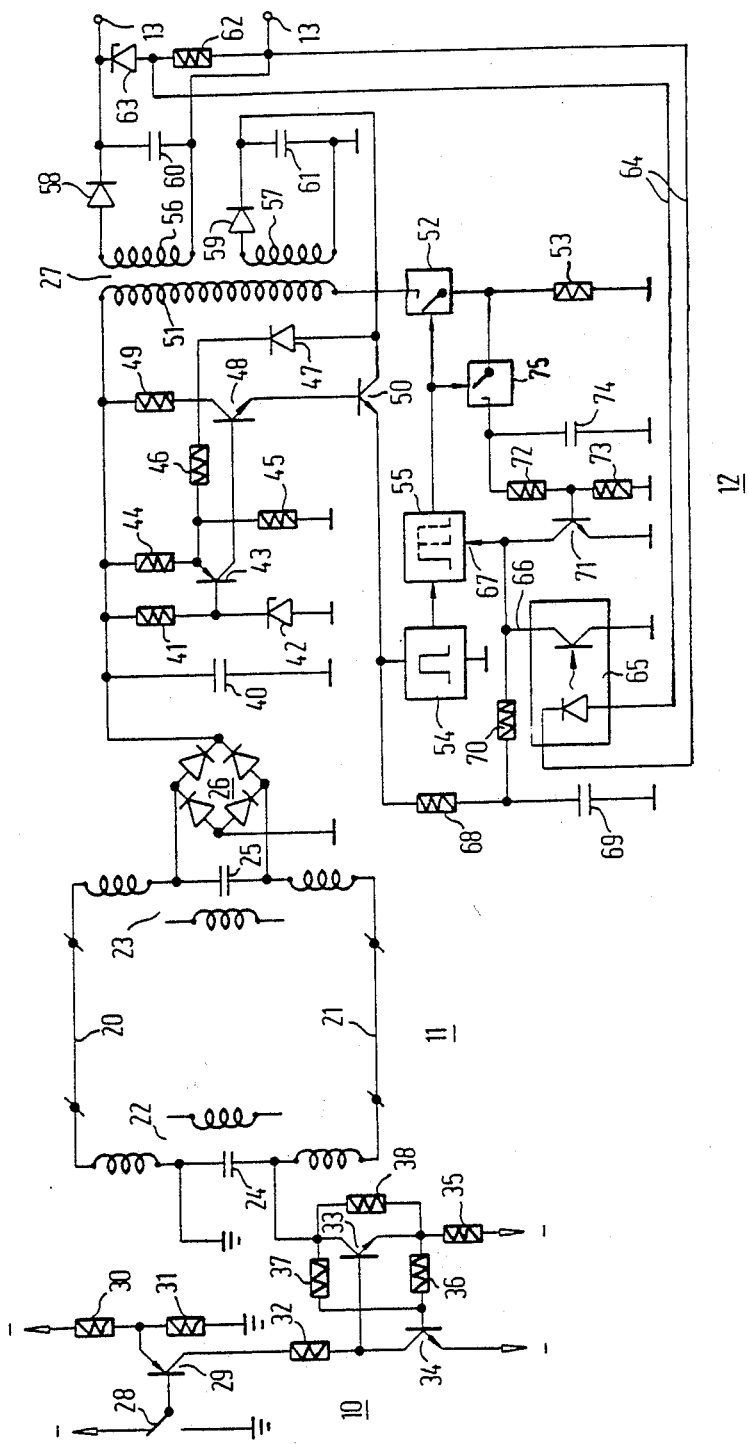

4,803,722

CIRCUIT FOR REMOTE SUPPLY OF SUBSCRIBER LINE TERMINALS IN A TELECOMMUNICATION SYSTEM

TECHNICAL FIELD

The present invention relates to a circuit for remote supply of subscriber line terminals in a telecommunication system, and particularly a telephone extension system, from a central source of current by way of a supply circuit and the subscriber line.

BACKGROUND ART

In telecommunication systems, it is known that not only the subscriber instrument itself but also auxiliary equipment may be supplied with current by way of the subscriber line. Besides information signals, that is, a direct current supply for a terminal is transmitted by way of the subscriber line as well, for which purpose special disconnection circuits are provided at the beginning and end of a subscriber line to cut the information signals in and out respectively.

In modern telecommunication systems, and particularly digitally operating telephone extension systems, use is increasingly being made of intelligent terminals, equipped with microprocessors, at the subscriber connections. Examples of such terminals are digital telephone subscriber stations, data printers, monitors, etc. These terminals have heretofore been supplied directly from the power supply network, since their operation requires a preassigned supply voltage which is subject as little as possible to fluctuation in order to ensure proper function or stable operation. Remote supply of such terminals by way of the subscriber line is not consistent wiht prevailing concepts of circuitry, because, due to the electrical properties of the lines used in telecommunication systems, fluctuations in current and/or voltage, especially when such a supply system is connected to the central source of current, may lead to uncontrolled switch-on and switch-off processes which firstly may cause errors in the transmission and evaluation of the information signals and secondly, due to sharply fluctuating supply currents, may produce adverse side effects on other components of the telecommunication system, which may likewise lead to uncontrolled operating conditions.

If it is desired nevertheless to achieve remote supply of subscriber line terminals by way of the subscriber line, requirements must be met that result from the special employment of power supply by way of the subscriber line. A first requirement consists, in view of the limited load capacity of a subscriber line, of keeping the tension of a supply current carried by it comparatively low, for which purpose the system as a whole must have an optimal efficiency. At the same time, however, both the short circuit capability and the overload capability of the system must be assured, since in telecommunication systems both operating conditions may occur often because of the high line resistances compared to network power supply. These line resistances result in excessively strong switch-on currents on the subscriber line when a terminal is connected to it, producing such high voltage drops on it that the connected terminal will disconnect itself from the subscriber line again due to insufficient operating voltage. Hence, means should be provided to avoid such switching conditions. Finally, any ground loops in the system must also be avoided, since they may cause impairment of information signal transmission.

SUMMARY OF THE INVENTION

The object of the present invention is to achieve remote supply of subscriber line terminals, while meeting the requirements noted above, in as simple a way as possible, with the highest variety of available supply voltages and wiring systems.

According to the present invention, this object is accomplished, for a circuit of the type mentioned above, in that the terminal is preceded at the subscriber connection by a current converter having a primary side energy reservoir directly connected to the subscriber line and delivering the energy required for a switch-on operation of the current converter, and in that the supply circuit has a negative internal resistance, operative when a preassigned supply amperage is exceeded.

The invention solves the problems mentioned above by measures implemented at the beginning and end of the subscriber line. The terminal is preceded by a current converter by means of which high efficiency of the remote supply can be achieved. To avoid an excessive current load on the subscriber line, an energy reservoir is provided on the primary side of the current converter, and connected with the subscriber line, which reservoir satisfies the temporarily high current demand of the converter when switched on. Such an energy reservoir may advantageously comprise a capacitor. The measure implemented at the beginning of the subscriber line consists of equipping the supply circuit with components producing a negative internal resistance, operative when a preassigned supply current is exceeded. This affords the possibility of suitably limiting the current load on the subscriber line according to its length and its line resistance beforehand, without any excessively intense flow of current that would unduly lower the supply voltage on the subscriber line. The negative internal resistance of the supply circuit has the result that when a preassigned supply amperage is exceeded, a reduction to lower supply amperages takes place, thereby preventing a collapse of the supply voltage on the subscriber line. In interaction with this current limitation by negative internal resistance, the energy reservoir on the primary side of the current converter assumes the function of delivering a temporarily high current at the end of the subscriber line.

The terminal is supplied without ground, for in the current converter preceding the terminal, a converter transmitter is provided, galvanically separating the subscriber line from the terminal.

These advantageous properties of a circuit arrangement according to the present invention may be further improved by providing a switching current converter whose switching characteristic is regulated as a function of output voltage, the control parameter for regulation when the switch converter is switched on being formed with a rising flank of finite slope, so dimensioned that the preassigned supply amperage will not be exceeded.

If the parameter for control of the switching current converter, the value of which is derived from the output voltage of the converter, is provided with a rising flank of the kind described above, a so-called soft start of the converter is thereby achieved which avoids an excessively high current demand at switch-on, so that the energy reservoir provided to deliver this current demand may be of comparatively small size. The rising flank for the control parameter is then dimensioned as a function of the size of the energy reservoir, in such manner that the preassigned supply amperage is not exceeded.

As a further advantage of the invention, the soft start principle for the switch current converter explained above may be implemented if the switching characteristic is regulated by means of a voltage-controlled pluse width modulation of the switching pulses for the primary side circuit of the current converter and the voltage control circuit has an RC delay branch. A voltage rise with slope proportioned to the energy reservoir can in fact be brought about very simply by a delay of the initial voltage surge, coupled with the voltage control, by means of an RC element whose potential curve with respect to capacitance is simply superimposed in the process of charging the control voltage for the pulse width modulation.

In so doing, a limitation of the pulse width modulation to a preassigned maximum pulse width may be provided, whereby the converter transmitter can be kept out of a state of magnetic saturation. This measure likewise contributes to limiting the current load on the subscriber line.

Advantageously, the switching current converter contains a threshold circuit under input voltage on the primary side, whose threshold is the switching-on criterion for the primary side switching pulses. What this accomplishes is that when a subscriber line is switched to a central source of current, the input voltage for the current converter must first rise to a preassigned value, whereupon the current converter can be started by switching in the primary side switching pulses. This means that the electric potential at the energy reservoir, likewise provided on the primary side of the current converter, must first have reached a preassigned value prior to loading by the start of the current converter.

The measures according to the invention lead to a remote supply of subscriber line terminals in which current and voltage fluctuations as well as their associated extremes are avoided. The operation of the invention manifests itself not only when remote supply is switched on, but also in equalizing processes of other kinds that may cause current and voltage fluctuations on the subscriber line owing to outside influences. Such fluctuations also are forestalled by a system constructed according to the invention. An essential advantage of the invention resides in that the principle can be applied to line concepts of various kinds, particularly two-wire and four-wire lines.

BRIEF DESCRIPTION OF THE DRAWINGS

The single FIGURE of drawings shows a circuit arrangement for remote supply of a subscriber line terminal, with a central supply circuit, subscriber line and current converter circuit.

DESCRIPTION OF THE PREFERRED EMBODIMENT

In the figure, a circuit arrangement for remote supply of a subscriber line terminal is represented which is employed for example within a telephone extension system and generally comprising a supply circuit 10, a subscriber line 11 and a current converter circuit 12 deliveirng the supply voltage for a terminal at its output 13. The supply circuit 10 is centrally arranged and is supplied from a central source of current furnished with negative operating voltage relative to ground. The supply circuit 10 is connected to the two leads 20 and 21 of the subscriber line 11 by way of a voice transmitter 22 which in a conventional manner combines the supply of current with the information signals on the subscriber line 11. At the end of the subscriber line 11, a separating transmitter 23 is provided, separating the information signals from the supply current so that they may be processed in some manner which need not be discussed herein. For mutual galvanic decoupling of the two leads 20 and 21 of the subscriber 11, a condenser 24, 25 is provided at the beginning and end thereof.

The subscriber line 11 is connected to the converter circuit 12 by way of a protective circuit 26 consistng of four rectifier diodes and serving as polarization protection for the converter circuit 12. The converter circuit 12 contains, as a galvanic separating element, a converter transformer 27 whereby the supply voltage delivered at the output 13 for a terminal from the primary side and from the subscriber line, i.e. free from ground.

The supply circuit 10 is capable of being switched on by a central switch signal whose effect is represented in the figure by a closed switch 28 connecting the base of a transistor 29 to the operating voltage. The emitter of the transistor 29 is in contact with a voltage divider comprising two resistances 30 and 31 and deriving an emitter voltage from the operating voltage. The collector of the transistor 29 is connected by way of a resistance 32 to the base of a transistor 33 and to the collector of a transistor 34 connected to the operating voltage at its emitter. The transistor 33 is connected at its collector to subscriber line lead 21 and to operating voltage by way of an emitter resistance 35. Further, the base of transistor 34 is connected by way of a resistance 36 to the emitter, and by way of a resistance 37 to the collector of transistor 33. In parallel with the emitter-collector segment of transistor 33, there is a resistance 38.

The energy reservoir on the primary side of the current converter 12 is a condenser 40 connected between the positive side of diode circuit 26 and ground. The condenser 40 is in parallel with a series circuit which consists of a resistance 41 and a Zener diode 42. The Zener diode 42 is impressed in its barrier direction by way of resistance 41 with the direct current voltage delivered by the diode circuit 26 and supplied by way of the subscriber line 11. The Zener voltage dropping on the Zener diode 42 is a base voltage for a transistor 43 receiving its emitter voltage by way of a voltage divider comprising two resistances 44 and 45. Further, the emitter of this transistor 43 is supplied with a direct current voltage by way of a resistance 46 and a diode 47 connected to the secondary side of the converter transmitter 27. The collector of transistor 43 is connected directly to the base of a transistor 48 receiving its collector voltage by way of a resistance 49 from the input voltage of the current converter and, by way of its emitter, controlling a transistor 50 at its base, the collector of which, like diode 47, is connected to the secondary side of the converter transformer.

The primary winding 51 of the converter transformer 27 is in contact at one end with the positive input voltage of the current converter and at the other end to ground by way of an electronic switch 52 and a resistance 53. The electronic switch 52, in a manner to be described, is switched periodically by the switching pulses of a pulse generator 54 after said switch pulses have passed through a pulse width modulator 55.

The converter transformer 27 has two secondary windings 56 and 57, each delivering a pulsating voltage by way of a diode 58, 59 to charge a condenser 60, 61 so that a direct current voltage appears at the latter, which serves as supply voltage for the terminal when derived from the secondary winding 56 at output 13 of the current converter and operates the pulse generator 54 when derived from the secondary winding 57 by way of the transistor 50.

The condenser 60 is in parallel with a series circuit consisting of a resistance 62 and a Zener diode 63. At the resistance 62, a direct current voltage appears, which by way of a line 64 is supplied as control voltage to a control circuit to keep the supply voltage delivered at output 13 substantially constant by voltage control at the pulse width modulator 55 and corresponding control of the mode of electronic switching 52, as is conventional for switching current converters of the kind considered here.

The control circuit contains an opto-coupler 65 that converts the direct current voltage supplied to it by way of lines 64 into a control voltage for the pulse width modulator 55 and delivers the same at its output 66, bringing it to the control input 67 of the pulse width modulator 55. This control voltage is further superimposed with a direct current voltage derived from the operating voltage for the pulse generator 54, tapped from an RC series circuit of a resistance 68 and a condenser 69, and passed by way of a resistance 70. The control input 67 of the pulse width modulator 55 is further connected to the emitter segment of a transistor 71 whose emitter is connected to ground. The base is in contact with the tap of a voltage divider composed of two resistances 72 and 73 and in parallel with a condenser 74. This arrangement is periodically connected, by way of an electronic switch 75, likewise controlled by the switching pulses delivered from the pulse width modulator 55, to the voltage dropping across at the resistance 53 as the electronic switch 52, which is to say the primary circuit of the current converter, is periodically switched on.

The operation of the circuit described above will now be discussed, beginning with an explanation of the function of the supply circuit 10. When the supply circuit 10 is switched on by actuation of the switch 28, the base of transistor 29 is thereby connected to the operating voltage. Thus, the transistor 29 becomes conductive and delivers a base current by way of resistance 32 for transistor 33, which thereby likewise becomes conductive and connects subscriber line 11 to the operating voltage. Since upon initial switch-on of the system, the condenser 40 at the input of current converter 12 is as yet uncharged, a switch-on current surge will result whereby the supply circuit 10 is steered into a range of negative internal resistance. Here the emitter resistance 35 of transistor 33 functions as a current sensing resistor, and the voltage dropping across it, which is proportional to the switch-on current surge, renders transistor 34 conductive by way of resistance 36, so that its assumes the base current previously supplied to transistor 33. Transistor 33 is thereby steered into the non-conductive state, with the help of the regenerative effect associated with resistance 37. At the same time resistances 36, 37 and 38 permit a small flow of current to the subscriber line 11, slowly charging the condenser 40 at the input of the current converter 12.

As the charge potential of condenser 40, which is the input voltage of current converter 12, slowly rises, the emitter voltage of transistor 43 exceeds the reference voltage fixed by Zener diode 42 and acting at the base of transistor 43. This renders transistor 43 conductive and in turn makes transistor 48 conductive, whereby the latter supplies pulse generator 54 with current by way of resistance 49 and the base-emitter diode of transistor 50. Pulse generator 54 then generates a pulse sequence of fixed frequency, which is supplied to the pulse width modulator 55. At its control input 67, however, the pulse width modulator 55 receives a direct current voltage by way of resistance 70, tapped from the RC series circuit 68, 69 in contact with the operating voltage of the pulse generator 54. with actuation of transistor 48 simultaneoulsy with the switch-on of pulse generator 54, a slowly rising direct current voltage is delivered to the control input 67 of pulse width modulator 55, whereby the latter keeps the pulse width of the switch pulses supplied to the electronic switch 52 small and allows it to increase only with corresponding slowness. In this way, it is prevented that upon starting of the current converter, and attendance high energy demand on the secondary side, the control signals derived from resistance 32, which in themselves call for a large pulse width, may not become fully operative at first, but only after the delay due to the RC series circuit 68, 69. This ensures that the condenser 40 will not be too highly charged upon start-up of the current converter 12. It should be realized that the time constant of RC series circut 68, 69 is to be dimensioned according to the size of the condenser 40, viz. that given a suitably dimensioned time constant, the condensor 40 may be of comparatively small size.

Since any overcharging of condenser 40 is avoided, no excessive current that might steer the supply circuit 10 into current limitation mode can be generated on the subscriber line 11.

One measure for delaying the action of pulse width control at the control input 67 of the pulse width modulator 55 involves the fact that upon start-up of current converter 12, the direct current voltage appearing at output 13 is fed into the control loop by way of Zener diode 63. Only when the Zener potential of Zener diode 63 has been attained can the output voltage be evaluated as a parameter by way of line 64 and opto-coupler 65.

The resistance 53 is series with electronic switch 52 acts a current sensing resistance, and the voltage dropping upon it is periodically supplied by way of electronic switch 75 to condenser 74, where a direct current voltage results that renders transistor 71 conductive by way of voltage divider 72, 73 when a preassigned value is reached. Thus, a limitation of the pulse width of the switch pulses delivered by the pulse switch modulator 55 is achieved when a predetermined base voltage of transistors 71 is reached. This in turn leads to a limitation of the current through the primary winding 51 of converter transmitter 27, avoiding its magnetic saturation.

The entire control circuit, during continuous operation of the current converter 12, is supplied with current from the secondary winding 57 by way of the rectifier 59, 61, since transistor 50 is rendered conductive. Then transistor 48 only has to supply the base current for transistor 50. At the same time, diode 47, by way of resistance 46, delivers a direct current voltage derived from the secondary winding 57 to the emitter of transistor 43, whereby the latter is kept conductive, even if the input voltage supplied to current converter 12 drops below the described switch threshold that becomes operative in the nonconductive state of transistor 43. In this way, the current converter remains in operation when the input voltage supplied to it drops sharply. The effect is a hysteresis switching behavior, that is, a switch-off voltage of current converter 12 smaller than the switch-on voltage. This ensures continuous operation of the current converter 12 at preassigned output voltage, even if its input voltage is comparatively highly variable, for example because of influences on subscriber line 11 or alternating switching conditions in the supply circuit 10.

What is claimed is:

1. An improved circuit for remotely supplying electrical power to subscriber line terminals in a telecommunication system, from a central source of electrical current by way of a supply circuit and a subscriber line, wherein each terminal is connected to the subscriber line by a switching current converter having a primary side and a primary side energy reservoir connected to the subscriber line so as to supply power to the current converter, said switching current converter being switchable between an on and off state in response to a switching signal and supplying a preselected level of current, wherein the improvement comprises:

said switching current converter having an output voltage and including a control circuit for controlling the switching of said converter in accordance with said output voltage, said control circuit including means for generating a control signal for controlling the switching of said converter, said control signal having a rising flank of finite slope when said converter is switched on and possessing characteritistics to prevent said preselected current level from being exceeded, said converter further including a switching circuit having a primary side controlled by switching pulses, and said control circuit including a voltage controlled pulse width modulator for generating said switching pulses, and means for controlling the voltage applied to said modulator, said voltage controlling means including a resistance and a capacitance arranged as a delay circuit.

2. The improved circuit according to claim 1, wherein said control circuit includes a current branch for limiting the width of the pulses generated by said pulse width modulator to a preselected pulse width.

3. The improved circuit according to claim 1, wherein said current converter includes a threshold circuit coupled with and receiving voltage applied by said subscriber line, said threshold circuit having a threshold voltage corresponding to the voltage required to generate said switching pulses.

4. The improved circuit according to claim 3, wherein:

said threshold circuit includes a switching transistor having a base electrode provided with a reference voltage, said switching transistor being operative to produce a control voltage, and said control circuit includes a pulse generator responsive to said control voltage for producing pulses modulated by said pulse width modulator.

5. The improved circuit according to claim 4, wherein said pulse generator has a supply current and said switching transistor possesses an operating voltage derived from said supply current.

6. The improved circuit according to claim 5, wherein said switching circuit of said converter includes a secondary side, and said supply current of said pulse generator is derived from said secondary side.

7. An improved circuit for remotely supplying electrical power to subscriber line terminals in a telecommunication system from a central source of electrical current by way of a supply circuit and a subscriber line, wherein each terminal is connected to the subscriber line by a switching current converter having a primary side and a primary side energy reservoir connected to the subscriber line so as to supply power to the current converter, said switching current converter being switchable between an on and off state in response to a switching signal and supplying a preselected level of current, wherein the improvement comprises:

said supply circuit including a first resistor, a second current sensing resistor, and a transistor, said transistor being connected in a current path between said central source and said subscriber line and in series with said current sending resistor, the base of said transistor being fed by said signal for switching on said current converter, said transistor being switchable from an on to an off state in response to a voltage drop across said current sensing resistor, said first resistor being connected between the emitter and collector of said transistor and having a resistive value greater than the resistance of said transistor when said transistor is in the on state.

8. The improved circuit of claim 7, wherein said transistors operates in a regenerative mode.

9. An improved circuit for remotely supplying electrical power to subscriber line terminals in a telecommunication system, from a central source of electrical current by way of a switchable supply circuit and a subscriber line, wherein each terminal is connected to the subscriber line by a switching current converter having a primary side and a primary side energy reservoir connected to the subscriber line so as to supply power to the current converter, the switching current converter being switchable between an on state and an off state in response to a switching voltage supplied by the energy reservoir, wherein the improvement comprises:

said supply circuit including means for reducing the magnitude of current supplied by said supply circuit to said current converter after said current has reached a predetermined value, and said current converter including a control circuit having hysteresis means for producing a hysteresis in the switching characteristics of said converter such that the voltage supplied by said energy reservoir at which said converter is switched-on is higher than the voltage supplied by said energy reservoir at which said converter is switched off.

10. The improved circuit of claim 9, wherein said converter supplies a predetermined level of output current and said control circuit includes means for generating a control signal for controlling the switching of said converter, said control signal having a rising flank of finite slope when said converter is switched on and possessing characteristics to prevent said predetermined current level from being exceeded.

11. The improved circuit according to claim 10, wherein:

said converter includes a switching circuit having a primary side controlled by switching pulses, and said control circuit includes a voltage controlled pulse width modulator for generating said switching pulses, and means for controlling the voltage applied to said modulator, said voltage controlling means including a resistance and a capacitance arranged as a delay circuit.

12. The improved circuit according to claim 11, wherein said control circuit includes a current branch for limiting the width of the pulses generated by said pulse width modulator to a preselected pulse width.

13. The improved circuit according to claim 11, wherein said current converter includes a threshold circuit coupled with and receiving voltage applied by said subscriber line, said threshold circuit having a threshold voltage corresponding to the voltage required to generate said switching pulses.

14. The improved circuit according to claim 13, wherein:
said threshold circuit tincludes a switching transistor having a base electrode provided with a reference voltage, said switching transistor being operative to produce a control voltage, and
said control circuit includes a pulse generator responsive to said control voltage for producing pulses modulated by said pulse width modulator.

15. The improved circuit according to claim 14, wherein said pulse generator has a supply current and said switching transistor possesses an operating voltage derived from said supply current.

16. The improved circuit according to claim 15, wherein said switching circuit of said converter includes a secondary side, and said supply current of said pulse generator is derived from said secondary side.

17. The improved circuit according to claim 10, wherein said supply circuit includes:
a first resistor,
a second current sensing resistor, and
a transistor connected in a current path between said central source and said subscriber line and in series with said current sensing resistor, the base of said transistor being fed by a signal for switching on said current converter, said transistor being switchable from an on to an off state in response to a voltage drop across said current sensing resistor, said first resistor being connected between the emitter and collector of said transistor and having a resistive value greater than the resistance of said transistor when said transmitter is in the on state.

18. The improved circuit according to claim 17, wherein said transistor operates in a regenerative mode.

19. An improved circuit for remotely supplying electrical power to subscriber line terminals in a telecommunication system, from a central source of electrical current by way of a supply circuit and a subscriber line, wherein each terminal is connected to the subscriber line by a switching current converter having a primary side and a primary side energy reservoir connected to the subscriber line so as to supply power to the current converter, said switching current converter being switchable between an on and off state in response to a switching signal and supplying a preselected level of current, wherein the improvement comprises:
said switching current converter having an output voltage and including a control circuit for controlling the switching of said converter in accordance with said output voltage, said control circuit means for generting a control signal for controlling the switching of said converter, said control signal having a rising flank of finite slope when said converter is switched on and possessing characteritics to prevent said preselected current level from being exceeded, and
said supply circuit includes
(1) a first resistor,
(2) a second current sensing resistor, and
(3) a transistor connected in a current path between said central source and said subscriber line and in series with said current sensing resistor, the base of said transistor being fed by a signal for switching on said current converter, said transistor being fed by a signal for switching on said current converter, said transistor being switchable from an on to an off state in response to a voltage drop across said current sensing resistor, said first resistor being connected between the emitter and collector of said transistor and having a resistive value greater than the resistance of said transistor when said transistor is in the on state.

20. The improved circuit according to claim 19, wherein said transistor operates in a regenerative mode.

* * * * *